3,004,003
PREPARATION OF POLYESTER CONTAINING Δ⁴-TETRAHYDROPHTHALIC ACID RADICALS
Hans Batzer, Stuttgart-Feuerbach, Germany, assignor to C. F. Roser G.m.b.H., Stuttgart-Feuerbach, Germany
No Drawing. Filed Jan. 27, 1956, Ser. No. 561,917
Claims priority, application Germany Jan. 29, 1955
1 Claim. (Cl. 260—75)

The invention relates to polyesters containing groups of the type of Δ⁴-tetrahydrophthalic acid and a process for their manufacture. The term polyester means such macromolecular compounds which contain more than 10 ester groups in the molecule.

Such groups correspond to the formula

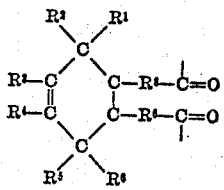

wherein $R^1$, $R^2$, $R^3$, $R^4$, $R^5$, $R^6$ designate hydrogen, alkyl, aryl or acyl or hydroxyl and esters thereof, whereby $R^1$ or $R^2$ may form with $R^5$ or $R^6$ an endomethylene or endoethylene bridge and $R^7$ and $R^8$ may be hydrogen or another substituent such as, for example, lower alkyl groups.

It is already known to subject low molecular compounds such as maleic acid and maleic or fumaric acid derivatives to dienic addition reactions with the most different dienic compounds.

It is also known to prepare polyesters containing olefinic groups, particularly polyesters of maleic or fumaric acid. It has also been tried to prepare polyesters of the Δ⁴-tetrahydrophthalic acid. However the structure of the ortho-phthalic acid renders such reaction very difficult and even under extreme reaction conditions polyesters with molecular weights higher than about 2000 can not be obtained.

It is a principal object of the invention to provide a simple and economic method of preparing polyesters of the above defined type having a molecular weight of at least 2000.

Other objects and advantages will become apparent from the specification and claims.

According to the invention, a polyester containing dienophilic acid components, is subjected to a diene addition reaction, preferably at temperatures below 120° C. In this way, polyesters containing Δ⁴-tetrahydrophthalic acid or derivatives thereof of any desired molecular weight particularly those of high and very high molecular weight may be obtained. Such polyesters are built up from compounds of the type of o-tetrahydrophthalic acid, and polyhydric alcohols; they may also contain mixed esters with other saturated or unsaturated polycarboxylic acid groups. The polyesters may form linear or branched chains.

Suitable polyesters, containing a dienophilic acid group as component, are the reaction products of diols such as, for example, ethylene glycol, hexanediol, butanediol, butylene glycol, butene diol, diglycol, and the like and which may in addition contain polyols such as pentaerythritol, glycerol, hexanetriol and so on with butenedioic acids or their substitutes or their anhydrides, such as maleic or fumaric acid. In addition to said dicarboxylic acids, one or more other polycarboxylic acids may be incorporated in the polyester, for instance succinic acid, glutaric acid, adipic acid, sebacic acid, tartaric acid, citric acid, keptopimelic acid, acetonedicarboxylic acid, terephthalic acid, and the like. The above described polyesters with dienophilic groups are subjected at least partially to a diene addition reaction.

For the Diels-Adler diene addition, all compounds having a conjugated double bond may be used, particularly butadiene, cyclopentadiene, cyclohexadiene, 2-ethyl-2,4-hexadiene-1-ol-esters, and the like.

The following examples are given to illustrate the method of the invention, it being understood that these examples are not intended to limit the scope of the invention in any way.

Example 1

To a polyester of maleic acid and 1,6-hexanediol, which had been prepared as set forth below and which had an average molecular weight of about 3000 cyclopentadiene was slowly added at room temperature with stirring. The mol ratio of the cyclopentadiene employed corresponded to the number of the double bonds of the polyester. Subsequently, the solution was heated up to about 60° C. and kept at said temperature for 3 hours with stirring. The obtained clear, slightly yellowish product was the polyester of 3,6-endomethylene-Δ⁴-tetrahydrophthalic acid with 1,6-hexanediol.

The polyester used as starting material had been prepared as follows: 1 mole of maleic anhydride and 1 mole of 1,6-hexanediol were kept in the molten state at about 90° C. for about 2 hours. The water generated thereby was drawn off in vacuo. Subsequently, the temperature was raised to about 120 to 130° C., the melt was stirred during esterification, and the formed water was removed from time to time. In order to interrupt the esterification, .1 mole of octanol was added after about 20 hours and the reaction was continued until the acid number has fallen to below 5. It may be of advantage to carry out the esterification in the presence of a catalyst, such as p-toluene sulfonic acid. In this way, the reaction temperature may be lowered and the reaction time can be reduced.

The following method of preparing the starting polyesters is particularly suitable for preparing polyesters having an elevated softening point and for polyesters to be processed according to the invention.

1 mole of fumaric acid and 1 mole of 1,4-butanediol are molten together at a temperature of 120 to 130° C. After addition of 1.5 percent of p-toluene sulfonic acid, the mass is dissolved in chlorobenzene to a 20% solution. By distillation of the chlorobenzene, the formed water of reaction is removed; the concentration of the batch is maintained by addition of dry chlorobenzene.

The last described method is also suitable for the preparation of starting polyesters containing polyfunctional components. Mixed polyesters may be prepared by reacting simultaneously different dicarboxylic and/or polycarboxylic acids and different dihydric and/or polyhydric alcohols.

Example 2

A polyester consisting of ½ mole of maleic acid, ½ mole of sebacic acid and 1 mole of 1,4-butanediol and having an average molecular weight of 4000, was reacted with 2-ethyl-2,4-hexadien-1-ol ester in the same manner as described in Example 1. A highly viscous clear light-yellowish substance was obtained.

Example 3

The 20% chlorobenzene solution of the polyester prepared according to Example 1 by reacting 1 mole of fumaric acid, ½ mole of hexanediol, ½ mole of diglycol, was reacted under pressure with butadiene in a molar amount corresponding to the double bonds, in the presence of a polymerization inhibitor such as, for example, dinitrobenzene, hydroquinone in quantities of about .3%, first at room temperature and subsequently at elevated temperature. After removal of the solvent, a polyester of relatively low viscosity remained.

Example 4

A polyester prepared from 1 mole of maleic acid, .5 mole of 1,6-hexanediol and .5 mole of 1,2,4-butanetriol, having an average molecular weight of 5000, was reacted with the equivalent amount of 2-ethyl-2,4-hexadien-1-ol ester. A viscous-elastic polyester was obtained.

Example 5

A polyester containing ½ mole of fumaric acid, ½ mole of succinic acid, 1 mole of 1,6-hexanediol, was reacted at an elevated temperature of about 80° C. under stirring with ½ mole, calculated on the double bond, of cyclopentadiene. A polyester was obtained which contained as basic moles ¼ mole of fumaric acid, ½ mole of succinic acid, ¼ mole of 3,6-endomethylene-$\Delta^4$-tetrahydrophthalic acid, and 1 mole of 1,6-hexanediol; it had an average molecular weight of 2500, was of wax-like consistency and had a softening point of 48° C.

Example 6

A polyester was used as starting material which was similar to that of Example 5 but contained ketopimelic acid instead of succinic acid. Said polyester was reacted with cyclopentadiene as set forth in the preceding example.

Example 7

In the starting product of Example 4, the 1,2,4-butanetriol was replaced by butanediol, otherwise the procedure was the same.

According to the invention, polyesters containing components of the type of the $\Delta^4$-tetrahydrophthalic acid are obtained, the molecular weight of which may be varied between 2000 and more than 60,000, depending on the molecular weight of the polyester used as starting material. The novel high molecular weight polyesters are characterized by good gelling properties, very high resistance to migration and good stabilizing effects. They are suitable as plasticizers for instance for vinyl and acrylic high polymers and for various cellulosic derivatives. They are also useful intermediates for the preparation of compounds employed in the plastics, paint and varnish manufacture. For instance, they are readily modified by epoxidizing the double bond of the cycloaliphatic group or by attaching thereto hydrogen, halogen, or hydrogen halides. They may also be polymerized with vinyl compounds in the presence of the conventional catalysts. In this way for example 65 parts of polyester are dissolved with 35 parts of styrene with addition of 0.5% methyl-ethyl-ketone-peroxide and 0.01% cobaltnaphthenate or dimethylaniline and cured at 40° C. within 5 min. With respect to the usual combinations with linear aliphatic polyesters mixtures of monomers and polyesters of said type are of relative low viscosity and accordingly easily workable. The obtained cured resin is of low brittleness and of higher elasticity than those resins made from aliphatic polyesters.

I claim:

A method for the preparation of polyesters containing $\Delta^4$-tetrahydrophthalic acid radicals comprising subjecting a linear unsaturated polyester containing dienophilic groups and at least 10 ester groups formed by esterification of hydroxyl groups of a diol with a member of the group consisting of butenedioic acids and anhydrides thereof at temperatures of about 0 to 130° C. to the Diels-Alder synthesis with a conjugated diene in contact with a polymerization inhibitor.

References Cited in the file of this patent

UNITED STATES PATENTS

| 2,251,298 | Soday | Aug. 5, 1941 |
| 2,404,836 | Gerhart et al. | July 30, 1946 |
| 2,595,625 | Agnew | May 6, 1952 |

OTHER REFERENCES

Robitschek et al.: Ind. Eng. Chem., 46, 1628–32 (1954).